3,065,081
DIETARY GEL AND METHOD OF MAKING SAME
Herbert T. Leo and Thomas H. Bodfish, Anaheim, Calif., assignors to Mutual Citrus Products Company, Anaheim, Calif., a corporation of California
No Drawing. Filed June 7, 1961, Ser. No. 115,335
4 Claims. (Cl. 99—132)

This invention relates to a dietary gel and to a method of making the same. More particularly, the invention relates to a dietary gel composition having a dissolved solids content of between 20% and 30% by weight but including a sufficient amount of an artificial sweetener to impart to the final gel a sweetness equivalent to that of a gel containing at least 45% by weight of cane sugar, the gel being of a pleasingly palatable, firm texture capable of undergoing repeated refrigerating and thawing conditions without exhibiting any syneresis and without noticeable alteration of texture.

In Patent No. 2,801,178, issued to one of us jointly with Clarence C. Taylor, there is a disclosure of a minimum methoxyl pectinic acid and a method of making the same. A minimum methoxyl pectinic acid such as there described is used by us in making the dietary gel of our present invention. Preferably, the minimum methoxyl pectinic acid is that described in said Patent No. 2,801,178 as made by subjecting a high methoxyl citrus pectin to the enzymic action of a citrus peel-derived pectase in the presence of an excess of calcium carbonate and continuing enzymic action, in the presence of such excess of calcium carbonate, until there is no further tendency of the acidity of the reaction mass to increase appreciably on standing. The resulting pectinic acid, termed in said patent "a minimum methoxyl pectinic acid," is fully described in said patent, both as to its characteristics in the solid, discrete form in which it is obtained and also in the form of a standard dry, as well as a standard liquid, minimum methoxyl pectinic acid composition. In the practice of our present invention, we prefer to start with the standard dry minimum methoxyl pectinic acid composition, such as described in said patent, which may specifically comprise the following ingredients in the percentage by weight indicated:

| | Percent |
|---|---|
| Pure minimum methoxyl pectinic acid | 10.0 |
| Potassium citrate | 8.5 |
| Powdered sodium hexametaphosphate | 6.5 |
| Anhydrous dextrose | 75.0 |
| | 100.0 |

Such a minimum methoxyl pectinic acid is capable of forming an acid-type of gel, with or without sugar, but the gel formed therewith in the absence of sugar requires such a high acidity (numerically low pH value) as to be too tart to be palatable. Consequently, since the minimum methoxyl pectinic acid is also very calcium susceptible, it is more satisfactory to form a calcium-type of gel when a gel containing less than about 30% of dissolved solids, including sugar, is to be prepared. Patent No. 2,824,007, of which one of us is a joint patentee, describes the preparation of such a calcium-type of gel in which the calcium ions are furnished by the artificial sweetener used to impart the desired sweetness to the finished gel. In that case, calcium cyclamate and calcium saccharin, or calcium cyclamate alone, are used as the artificial sweetener, and the amount of the artificial sweetener used to impart the desired sweetness to the finished gel is also sufficient to provide the necessary amount of calcium ions to form the finished gel.

While such calcium-type gels, using an artificial sweetener and no, or substantially no sugar, constitute a very desirable dietetic product especially suited for consumption by diabetics, it is not usually possible to get quite so pleasing a texture of gel in the case of calcium-type gels as can be obtained with the acid-sugar type gel. On the other hand, conventional jams and jellies made from pectin or pectinic acid require a minimum of about 65% sugar content to be classified as jams and jellies under the rules and regulations of the Food and Drug Administration. Consequently, for those who desire a low calorie product of the jam or jelly type, there is a need for a gelled product having a much lower sugar content than the conventional jams and jellies. We have found that it is possible in accordance with the principles of our present invention to provide a low calorie gel composition, using the standard minimum methoxyl pectinic acid preparation of Patent No. 2,801,178, and using sodium cyclamate as the artificial sweetener instead of calcium cyclamate, together with the proper proportion of an edible organic acid to give an acid-type of gel with from 20 to 30% total dissolved solids content. In order, however, to obtain the desired sweetness, such that the finished gel has substantially the same sweetness to the taste of a 45% cane sugar gel, it is necessary to use an alkali metal cyclamate, such as sodium cyclamate, with or without the addition of sodium saccharin, in order to avoid the presence in the gel-forming mass of a sufficient proportion of bi-valent metal ions, such as calcium or magnesium, to form a calcium-type gel. It is also necessary, we have found, to use a higher proportion of our minimum methoxyl pectinic acid than the proportion given in either of the previously-named patents. This latter is a surprising fact and one for which we have no ready explanation.

It is therefore an important object of our invention to provide a dietary gel composition of the acid type, containing between 20 and 30% of dissolved solids by weight, that has a pleasing taste and a sweetness equivalent to that of a gel containing at least 45% by weight of cane sugar, and having a texture that is not only as satisfactory as the usual conventional sugar-acid type of jams and jellies but that is capable of being repeatedly refrigerated and thawed without exhibiting any syneresis and without any noticeable alteration of its texture.

It is a further important object of this invention to provide a dietary gel composition having not over about 30% of the caloric value of conventional acid-sugar types of jams and jellies and yet having a sweetness equivalent to that of a gel containing at least 45% by weight of cane sugar.

It is a further important object of this invention to provide a method of making a dietary gel composition, using more than the usual proportion of a minimum methoxyl pectinic acid and employing an alkali metal cyclamate as the artificial sweetening agent in conjunction with an amount of sugar and an edible flavoring substance, such as fruit, to produce a finished gel having a total dissolved solids content of between 20 and 30% by weight, all in conjunction with a sufficient proportion of a calcium sequestering agent, such as sodium hexametaphosphate, a buffering agent such as a soluble edible alkali metal oxy-organic acid salt, and an edible organic acid to produce an acid-type of gel having a pleasant taste and a texture that is stable toward repeated refrigeration and thawing without noticeable alteration of such texture.

Other and further important objects of this invention will become apparent from the following description and appended claims.

The invention will be particularly described in connection with the use of canned fruits and berries such as are now available on the market, and particularly those that are packed in a heavy or extra-heavy syrup containing from 20 to 30% of total dissolved solids, mostly sugar solids. Such canned fruits and berries may be in the frozen or unfrozen state. In the form in which such canned fruits and berries are served for human consumption, they do not have a jam-like texture, but are considered as "sauces," being syrupy rather than gel-like in texture.

The dietary gel composition prepared from such canned fruits and berries in accordance with the principles of our present invention are made from a mixture of four main components: (1) a standardized minimum methoxyl pectinic acid solution containing a sufficient amount of a calcium sequestering agent, such as sodium hexametaphosphate, and a sufficient amount of a soluble, edible, alkali metal oxy-organic acid salt, such as sodium or potassium citrate, to render the minimum methoxyl pectinic acid soluble to an extent of upwards about 3.5% by weight in boiling tap water containing not over 40 p.p.m. of calcium (hardness), the amount of water actually used in making the standardized minimum methoxyl pectinic acid solution being such as to give a solution of between 20 and 30% by weight of dissolved solids content and between about 2.0 and 3.5% of minimum methoxyl pectinic acid content; (2) an aqueous edible flavor-sugar mixture—such as the canned fruits and berries previously referred to, containing from 20 to 30% by weight of dissolved solids; (3) a sufficient amount of an artificial sweetener, specifically sodium cyclamate, with or without sodium saccharin, to give to the final gel a sweetness equivalent to that of a gel containing at least 45% by weight of cane sugar; and (4) an amount of an edible organic acid, such as citric acid, tartaric acid, or, more usually, lemon juice, sufficient to impart to the resulting gel composition a final pH of between 3.3 and 3.5. While the edible organic acid is referred to as Item (4), some acid, such as lemon juice, can be included in the standardized minimum methoxyl pectinic acid solution, and it is desirable to include some small proportion of acid in such solution where alkaline tap waters are used. Without any added acid, the standardized minimum methoxyl pectinic acid solution will have a pH of around 5.25, while, if lemon juice is added, the pH may be reduced to about 4.20. Ordinarily, however, no acid is necessary in the standardized minimum methoxyl pectinic acid solution.

In the method of making a dietary gel embodying the characteristics of the gel of our present invention, the main components (1), (2), (3) and (4), may be mixed together in any order, and the mixing is carried out with or without heat, but without the need or even desirability of heating the mixture to a boiling temperature. However, in forming the standardized minimum methoxyl pectinic acid solution, it is preferable to add the dry standardized pectinic acid mixture to boiling water, or to water near the boiling point, in order to insure the quick dissolution of the standardized mixture. This is in contrast with the procedure given in Patent No. 2,801,178, where a lower concentration of minimum methoxyl pectinic acid is used in making up the standardized minimum methoxyl pectinic acid solution, and where such lower proportion of minimum methoxyl pectinic acid is readily soluble in distilled water or water containing not over 40 p.p.m. of calcium, without clumping at ordinary room temperatures.

As to main component (1), pure minimum methoxyl pectinic acid such as that described in Patent No. 2,801,178, is mixed with sodium hexametaphosphate as the calcium sequestering agent and with potassium or sodium citrate, tartrate, or the like, as the solubilizing and buffering agent, and with anhydrous dextrose, or other substantially inert, water-soluble material as the standardizing diluent, to make a standardized minimum methoxyl pectinic acid composition meeting the gel standards set forth in said Patent No. 2,801,178. In dry form, the standard minimum methoxyl pectinic acid mixture may have the following composition:

| | Percent |
|---|---|
| Pure minimum methoxyl pectinic acid | 10.0 |
| Potassium citrate | 8.5 |
| Powdered sodium hexametaphosphate | 6.5 |
| Anhydrous dextrose | 75.0 |
| | 100.0 |

In preparing the standardized minimum methoxyl pectinic acid solution to be used in making the gel of our invention, 2½ ounces (avoirdupois) of the pure dry, standardized minimum methoxyl pectinic acid composition above given are added to 8 fluid ounces of boiling water, or water near the boiling point. Since the standardized dry composition contains 10% of pure minimum methoxyl pectinic acid, the resulting concentration of minimum methoxyl pectinic acid in the standardized solution is about 3%, or between 2.0 and 3.5% by weight. The total dissolved solids content is between 20 and 30%, and preferably about 24 or 25%.

The second main component (2) has already been described. Preferably, a syrup-packed or frozen fruit or berry product, containing between 20 and 30% total dissolved solids, mainly made up of cane sugar, is most suitably used. No further sugar is added during the making of the dietary gel of our invention, since no addition of sugar over and above what is contained in the syrup-packed fruit or berry is required to bring the total dissolved solids content of the final gel to between 20 and 30% by weight. The additional sweetening effect, as previously stated, that is required in the final gel is furnished by the use of an artificial sweetening agent, and more particularly by the use of sodium cyclamate, with or without sodium saccharin.

The artificial sweetener (3) is preferably prepared as described in Patent No. 2,865,761, except that in place of the calcium salt, the alkali metal cyclamate and saccharin are used, such as sodium cyclamate and sodium saccharin. The preferred composition is a 10% solution in water of sodium cyclamate, with or without sodium saccharin, but if sodium saccharin is used, the preferred composition is 8% sodium cyclamate and 2% sodium saccharin by weight of the solution, with a broader permissible range of from 5 to 10% of sodium cyclamate and from 5 to 0% of sodium saccharin. In addition to the sweetening compounds, themselves, the liquid composition may include about 0.10% of benzoate of soda and 0.005% of methyl parabenzoic acid for preservative purposes. For instance, in making up one liter of an aqueous solution of the sweetening composition, the preferred proportions are the following:

80 grams of sodium cyclamate
20 grams of sodium saccharin
½ gram of methyl parabenzoic acid
1 gram of benzoate of soda The final main component (4) may be any edible organic acid, such as citric, tartaric, or other oxy-organic acid, or, more simply, lemon juice itself. The amount of the edible organic acid to be used should be sufficient to impart to the final gel composition, formed by mixing, in any order, main components (1), (2), (3) and (4), a pH of between 3.3 and 3.5. A pH value within this range is sufficient to ensure that the final gel has a satisfactory, firm texture that is equally as pleasing as the usual or conventional jams or jellies containing a minimum of about 65% cane sugar. If the pH value is allowed to run much lower than 3.3, the gel becomes too tart to the taste, even though the texture may not be appreciably affected. On the other hand, the pH value may be numerically somewhat higher than 3.5, and even as high as 3.8 when the total dissolved solids content is near the maximum desired value of 30% by weight of the gel. In general, the higher the total dissolved solids content of the gel, the higher can be the pH, and, conversely, the lower the total dissolved solids content, between the range of 20 to 30% by weight, the lower may be the pH, numerically, and still get a satisfactory gel texture. For the most desirable balance of tartness against sweetness, the pH of the final gel should be between 3.3 and 3.5.

The following example serves to illustrate a preferred embodiment of our invention:

*Example*

A standardized minimum methoxyl pectinic acid solution is first prepared, in the manner already discussed, by dissolving 2½ ounces (avoidupois) of the dry standardized minimum methoxyl pectinic acid composition in 8 fluid ounces of boiling, or near boiling, water, which may be ordinary tap water containing not more than 40 p.p.m. of calcium, determined in the usual manner as in the determination of the "hardness" of water, or of distilled water. The resulting standardized liquid pectinic acid solution has a minimum methoxyl pectinic acid content of about 3% by weight, and a total dissolved solids content of about 24 or 25% by weight. As previously stated, if alkaline water is employed, a sufficient quantity of lemon juice is added to bring the pH of the standardized minimum methoxyl pectinic acid solution to about 4.20. If the pH of the solution is not over about 5.25, without the addition of any acid or lemon juice, no lemon juice need be incorporated into the solution.

As the source of the fruit or berry to be used, 2–10 ounce (avoidupois) cans of syrup-packed fruits or berries, containing from 20 to 30% of total dissolved solids, is used. If the fruit or berries are frozen, they should first be completely thawed by heating in a small kettle. To the resulting mass of liquid fruit or berry, at room temperature or other temperature not substantially over 100° F., is added the cup, or 8 fluid ounces, of previously prepared and completely dissolved minimum methoxyl pectinic acid composition.

Next, two teaspoonfuls of the prepared 10% solution of artificial sweetener, preferably sodium cyclamate itself, or a mixture of 8% of sodium cyclamate and 2% of sodium saccharin, are added to the mass in the kettle, and thereafter, still without the application of heat, ⅓ to ½ cup of freshly prepared lemon juice is added to the kettle to give the resulting mass a pH of between 3.30 and 3.50. The resulting mass can then be poured into glasses or jars, in which the product sets up to a gel almost immediately, and is ready for consumption. If it is desired to keep the product for future use, it can be kept for weeks stored in a refrigerator the same as milk, and then taken out just prior to use.

The finished gel product is well balanced as to sweetness and tartness, has a fine jam-like texture, when whole or cut-up fruit or vegetables are used, and a jelly-like texture when natural fruit juices or flavors are used. Where fresh fruits or berries are employed, they retain their natural flavor because no heat has even been applied to them, other than the moderate heat required for thawing out the frozen fruit or berries.

The resulting gel has about 30% of the caloric content of the conventional cooked jams or jellies found on the grocer's shelf and thus meets the requirements of a low calorie value expected in a diet for normal people concerned over their weight. The dietary gel of our invention is not intended for diabetics.

One of the principal advantages of the gel of our invention is that it exhibits no syneresis, either upon standing over long periods of time, or when subjected to successive refrigerating and thawing operations. Consequently, the gel is admirably adapted for use in pastry products, as in connection with the use of pre-baked pie crust, since it will not soak into the pastry or pie crust and therefore keeps the same in its initial dry, crumbly or flaky condition. This is a novel phenomenon in the case of acid-type gels of as low as sugar content as that represented by the 20 to 30% by weight of total dissolved solids content characteristic of the gels of our invention.

While the foregoing example has been described in connection with the use of units of measure customary in the kitchen, the amounts stated in the foregoing example result in percentages by weight of the various components, or ingredients, within the broader and more preferred ranges of percentages by weight given earlier in the more general description of our invention. It will be understood that it is not our intention to limit our invention otherwise than as necessitated by the prior art and by the appended claims.

We claim as our invention:

1. An acid-type dietary gel composition comprising: (1) a standardized minimum methoxyl pectinic acid solution containing a sufficient amount of sodium hexametaphosphate and of a soluble edible alkali metal oxy-organic acid salt in combination to render said pectinic acid soluble up to about 3.5% by weight in boiling water containing not over 40 p.p.m. of calcium, and an amount of such water sufficient to give a solution of between 20 and 30% by weight dissolved solids content and between 2.0 and 3.5% by weight of said minimum methoxyl pectinic acid; (2) an aqueous edible flavor-sugar mixture containing from 20 to 30% by weight of dissolved solids; (3) a sufficient amount of an artificial sweetener including an alkali metal cyclamate to give to the final gel a sweetness equivalent to that of a gel containing at least 45% by weight of cane sugar; and (4) an amount of an edible organic acid sufficient to impart to the gel composition formed by mixing in any order (1), (2), (3) and (4) a pH of between 3.3 and 3.8, said gel composition when so formed, without substantial heating at any time during and after such mixing, setting up without the aid of bi-valent metal ions to a firm texture gel capable of being repeatedly refrigerated and thawed without exhibiting any syneresis and without appreciable alteration of such texture, and having a dissolved solids content of between 20 and 30% by weight, a pH of between 3.3 and 3.8 and a minimum methoxyl pectinic acid content of between 0.6 and 0.9% by weight of said gel.

2. An acid-type dietary gel composition comprising: (1) a standardized minimum methoxyl pectinic acid solution containing a sufficient amount of sodium hexametaphosphate and of a soluble edible alkali metal oxy-organic acid salt in combination to render said pectinic acid soluble up to about 3.5% by weight in boiling water containing not over 40 p.p.m. of calcium, and an amount of such water sufficient to give a solution of about 25% by weight soluble solids content and about 3% by weight of said minimum methoxyl pectinic acid; (2) an aqueous edible flavor-sugar mixture containing from 20 to 30% by weight of dissolved solids; (3) a sufficient amount of an artificial sweetener consisting essentially of an alkali metal cyclamate to give to the final gel a sweetness equivalent to that of a gel containing at least 45% by weight of cane sugar; and (4) an amount of an edible organic acid sufficient to impart to the gel composition formed by mixing in any order (1), (2), (3) and (4) a pH of between 3.3 and 3.8, said gel composition when so formed, without substantial heating at any time during and after such mixing, setting up without the aid of bi-valent metal ions to a firm texture gel capable of being repeatedly refrigerated and thawed without exhibiting any syneresis and without appreciable alteration of such texture, and having a dissolved solids content of between 20 and 30% by weight, a pH of between 3.3 and 3.8 and a minimum methoxyl pectinic acid content of about 0.75% by weight of said gel.

3. An acid-type dietary gel composition comprising: (1) a standardized minimum methoxyl pectinic acid solution containing a sufficient amount of sodium hexametaphosphate and of a soluble edible alkali metal oxy-organic acid salt in combination to render said pectinic acid soluble up to about 3.5% by weight in boiling water containing not over 40 p.p.m. of calcium, and an amount of such water sufficient to give a solution of between 20 and 30% by weight dissolved solids content and between 2.0 and 3.5% by weight of said minimum methoxyl pectinic acid; (2) an aqueous edible flavor-sugar mixture containing from 20 to 30% by weight of dissolved solids; (3) a sufficient amount of an artificial sweetener including an alkali metal cyclamate to give to the final gel a sweetness equivalent to that of a gel containing at least 45% by weight of cane sugar; and (4) an amount of an edible organic acid sufficient to impart to the gel composition formed by mixing in any order (1), (2), (3) and (4) a pH of between 3.3 and 3.5, said gel composition when so formed, without substantial heating at any time during and after such mixing, setting up without the aid of bi-valent metal ions to a firm texture gel capable of being repeatedly refrigerated and thawed without exhibiting any syneresis and without appreciable alteration of such texture, and having a dissolved solids content of between 20 and 30% by weight, a pH of between 3.3 and 3.5 and a minimum methoxyl pectinic acid content of about 0.75% by weight of said gel.

4. The method of making an acid-type dietary gel, which comprises mixing together, without the application at any time during mixing or thereafter of any substantial amount of heat, the following main components: (1) a standardized minimum methoxyl pectinic acid solution containing a sufficient amount of sodium hexametaphosphate and of a soluble alkali metal oxy-organic acid salt in combination to render said pectinic acid soluble up to about 3.5% by weight in boiling water containing not over 40 p.p.m. of calcium, and an amount of such water sufficient to give a solution of between 20 and 30% by weight dissolved solids content and between 2.0 and 3.5% by weight of said minimum methoxyl pectinic acid; (2) an aqueous edible flavor-sugar mixture containing from 20 to 30% by weight of dissolved solids; (3) a sufficient amount of an artificial sweetener including an alkali metal cyclamate to give to the final gel a sweetness equivalent to that of a gel containing at least 45% by weight of cane sugar; and (4) an amount of an edible organic acid sufficient to impart to the gel composition resulting from mixing components (1), (2), (3) and (4) a pH of between 3.3 and 3.8; effecting said mixing in any order and allowing the resulting mixture to set to a gel, the setting being solely due to the acid pH effected and not to the presence of bi-valent metal ions, and the resulting gel being of a firm texture that is stable toward successive refrigerating and thawing thereof without exhibiting syneresis and without appreciable alteration of said texture, said resulting gel having a pH between 3.3 and 3.8 and a minimum methoxyl pectinic acid content of between 0.6 and 0.9% by weight of said gel.

References Cited in the file of this patent
UNITED STATES PATENTS

| | | |
|---|---|---|
| 2,865,761 | Leo et al. | Dec. 23, 1958 |
| 2,910,366 | Leo et al. | Oct. 27, 1959 |